UNITED STATES PATENT OFFICE

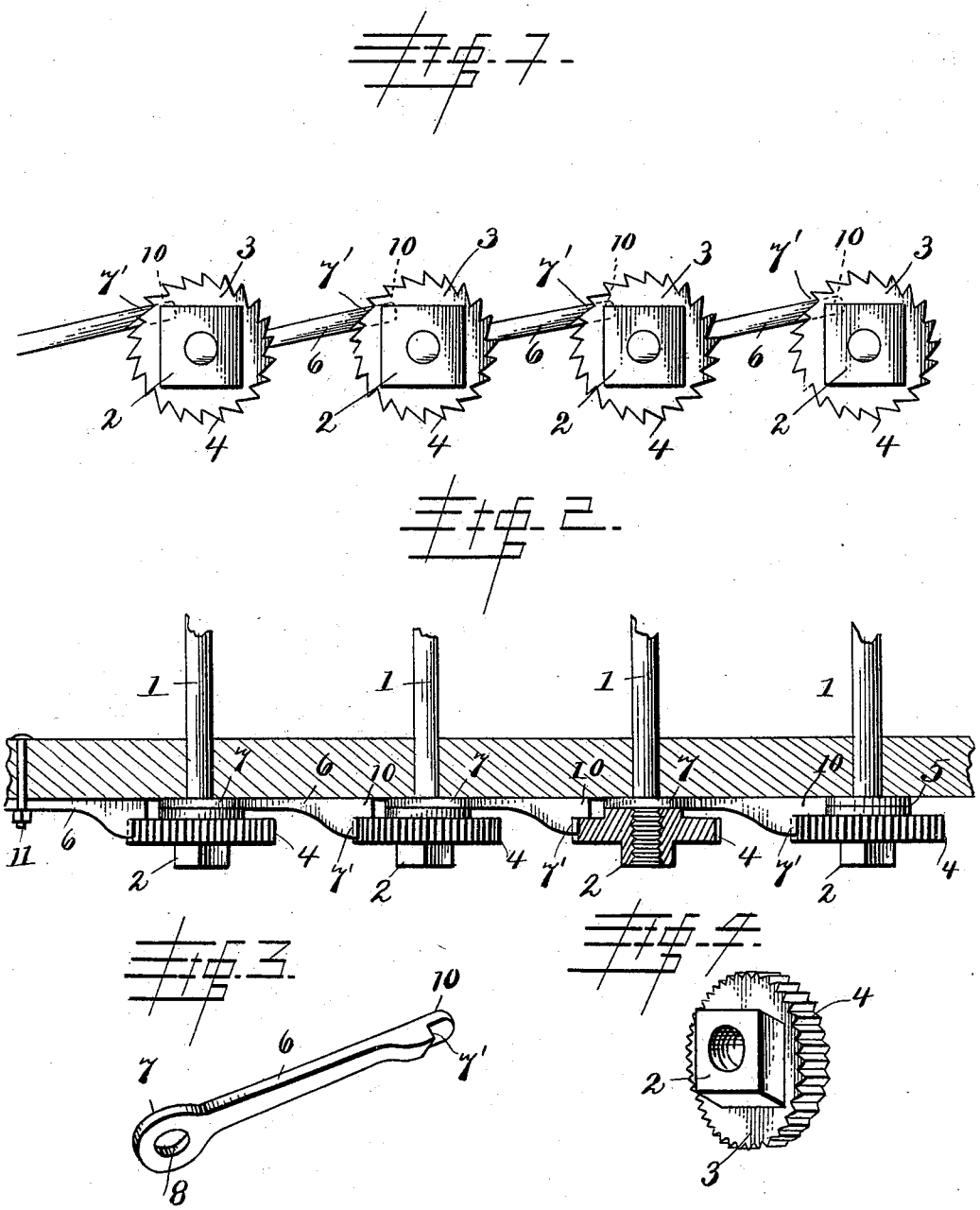

FREELING H. DEDRICK, OF GLIDDEN, IOWA.

NUT-LOCK.

SPECIFICATION forming part of Letters Patent No. 594,861, dated December 7, 1897.

Application filed July 28, 1897. Serial No. 646,243. (No model.)

*To all whom it may concern:*

Be it known that I, FREELING H. DEDRICK, a citizen of the United States, residing at Glidden, in the county of Carroll and State of Iowa, have invented certain new and useful Improvements in Nut-Locks; and I do declare the following to be a full, clear, and exact description of the invention, such as will enable others skilled in the art to which it appertains to make and use the same.

My invention relates to improvements in nut-locks for railroad-rails; and the object is to provide a simple, cheap, and effective device of this class.

To this end the invention consists in the construction, combination, and arrangement of the device, as will be hereinafter more fully described, and particularly pointed out in the claim.

In the accompanying drawings the same reference-characters indicate the same parts of the invention.

Figure 1 is a side elevation of my improved nut-lock. Fig. 2 is a horizontal section of the same. Fig. 3 is a detail perspective of the pawl, and Fig. 4 is a similar view of the nut.

1 represents the ordinary bolt, and 2 the nut, formed with an integral circular flange 3, the periphery of which terminates in a series of ratchet-shaped teeth 4, and the inner face of said flange, contiguous to the fish-plate, is provided with an annular shoulder 5, so as to form a space between the outer toothed edge of the flange and the fish-plate.

6 represents a spring-steel pawl, its rear end terminating in a flat heel 7, provided with a central orifice 8 for the reception of the bolt 1. The toe or forward end of this pawl 6 is formed with a ratchet-shaped tooth 7 and a projecting guard-arm 10, which extends between the outer face of the fish-plate and the contiguous or inner face of the flange 3 to prevent the lateral displacement of the free end of the pawl when in engagement with the teeth on the flange.

The nuts are placed in position on the bolts in regular order, beginning at the right-hand end of the fish-plate, which is first screwed home, and then the pawl is placed over the second bolt, with its free end in engagement with the teeth on the flange of the first nut. The second nut is then secured upon its bolt and the second pawl placed on the third bolt, and so on. The last or fourth pawl is secured to the fish-plate by a bolt or rivet 11 to secure the last or fourth nut from any backward movement. The pawl 6 being made of spring metal will permit the nut and ratchet in contact with its tooth 7' to be tightened up without interfering with the adjustment of the remaining pawls or nuts.

Although I have specifically described the construction and relative arrangement of the several elements of my invention, I do not desire to be confined to the same, as such changes or modifications may be made as clearly fall within the scope of my invention without departing from the spirit thereof.

Having thus described my invention, what I claim, and desire to secure by Letters Patent, is—

A nut-lock comprising the bolt 1, and the nut 2 formed with the flange 3 provided with a series of ratchet-shaped teeth 4, and an annular shoulder 5, in combination with the spring-pawl 6 having the flat heel 7 formed with the bolt-orifice 8 to engage an adjacent bolt, and having its toe formed with a ratchet-shaped tooth 9 and projecting guard-arm 10 to pass under the flange 3, substantially as shown and described.

In testimony whereof I hereunto affix my signature in presence of two witnesses.

FREELING H. DEDRICK.

Witnesses:
G. E. PEAREU,
J. D. KENNEDY.